Feb. 9, 1965   O. LJUNGSTRÖM   3,168,928
AIR CUSHION VEHICLE

Filed Jan. 10, 1963   2 Sheets-Sheet 1

Inventor
Olle Ljungström

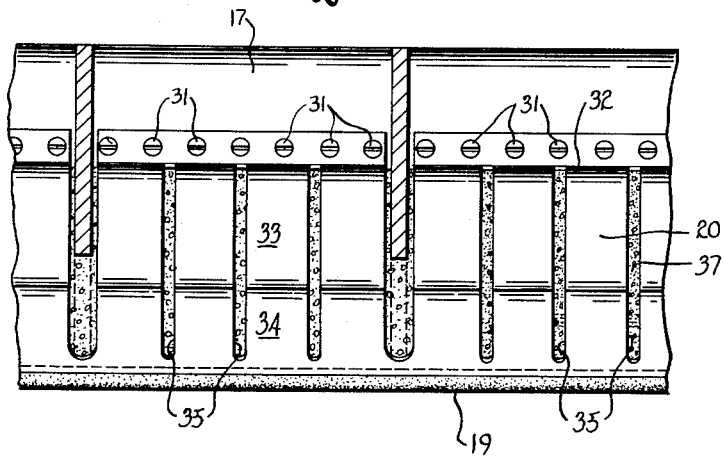
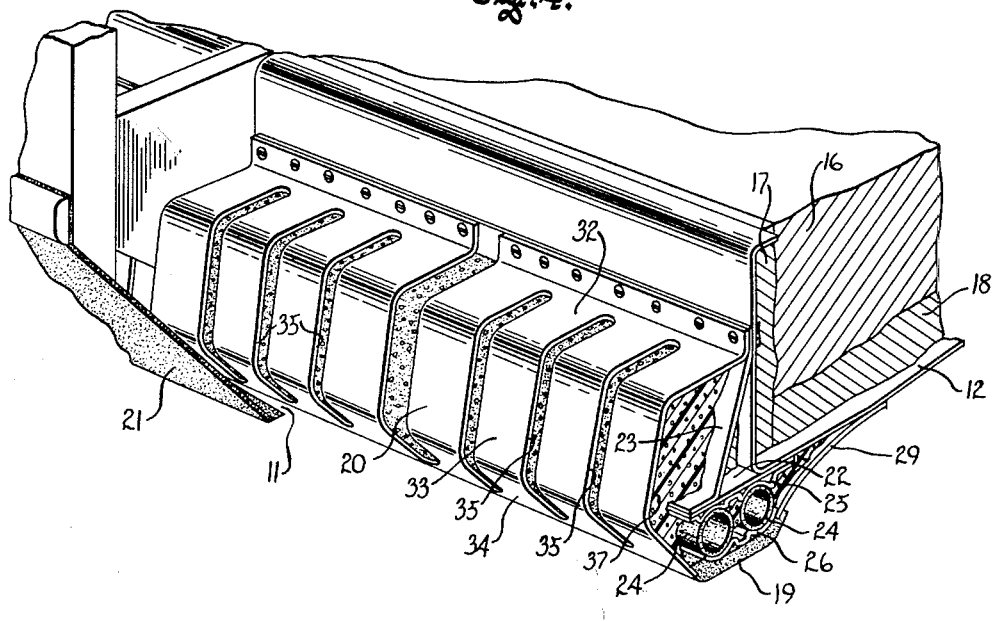

United States Patent Office 3,168,928
Patented Feb. 9, 1965

3,168,928
AIR CUSHION VEHICLE
Olle Ljungström, Brevik, Lidingo, Sweden, assignor to Svenska Aeroplan Aktiebolaget, Linkoping, Sweden, a corporation of Sweden
Filed Jan. 10, 1963, Ser. No. 250,568
7 Claims. (Cl. 180—7)

This invention relates to so-called air cushion or ground effect vehicles, which support themselves at a small distance above the surface of land or water on a cushion of downwardly displaced air; and the invention refers more particularly to means in such a vehicle for absorbing shocks due to its encountering irregularities in the surface of the ground during travel thereover or in the course of alighting.

Air cushion vehicles make use of the so-called ground effect which, as is well known, enables an aerodynamic vehicle to produce substantially greater lift with a given power when it is near the ground than when it is at what might be termed flight altitudes. Hence such vehicles displace air downwardly, expelling it in curtain-like jets, so that they can skim along a few inches above the surface, supported on a bubble-like cushion of air.

By its nature an air cushion vehicle is well adapted for travel over both land and water, including swampy areas that would be impassable to buoyant vessels and land surfaces that would be too rough and irregular for wheeled vehicles. Because an air cushion vehicle is very useful for off-highway travel over unprepared land surfaces, it should also be capable of withstanding the impacts of surface projections such as large rocks which it may encounter during travel over rough terrain, and of course it should also be capable of alighting on an irregular surface without shock or damage.

With this in mind it is an object of the present invention to provide an air cushion or ground effect vehicle having resiliently flexible runner-like shock absorbing means, or rails, at its underside for receiving and absorbing the impacts of surface irregularities without damage to the vehicle.

As brought out in my copending companion application, Serial No. 243,803, filed December 11, 1962, the main body portion of the vehicle of this invention has a transversely concave bottom wall, to promote efficient sustentation and better adapt it for travel over water, and hence the lowest parts of the vehicle body are along its sides, where the runner-like shock absorbing means are located. However, to further promote efficiency in the sustentation of the vehicle, an elongated downwardly opening air outlet extends along each of the runner-like rails, outwardly adjacent to it. It is essential that this air outlet not be blocked or substantially distorted by the resilient flexing of the rail, since otherwise the vehicle would lose lift.

Hence it is another object of this invention to provide a vehicle of the class described which can sustain substantial impacts against its side portions without suffering damage or permanent deformation and without loss of sustentation, despite the fact that the vehicle is provided with runner-like shock absorbing means at its bottom, extending along its length, which are inwardly adjacent to air outlets through which supporting jets or curtains of air are expelled.

Another object of this invention is to provide a vehicle of the character described having elongated, slot-like, downwardly opening air outlets at its sides which are defined by resiliently flexible wall elements that can yieldingly deform to absorb the shock of impacts against the vehicle, but which do not, as a result of such deformation, block or obstruct the outlets which they define, so that such impacts cannot interfere with sustentation of the vehicle.

A further and more specific object of this invention is to provide a structure comprising a rigid supporting frame or the like, a shock absorbing, yieldingly flexible runner mounted beneath the frame in a manner which provides for localized upward flexing of the runner relative to the frame, and a wall element which extends downwardly from the frame to the runner and which is capable of flexing with the runner.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 3 is a fragmentary vertical sectional view taken on the plane of the line 3—3 in FIGURE 2; and FIGURE 4 is a fragmentary view, partly in side perspective and partly in cross section, of one side of the vehicle at its side air outlet slot, the outer slot defining wall being shown cut away.

Figure 1:
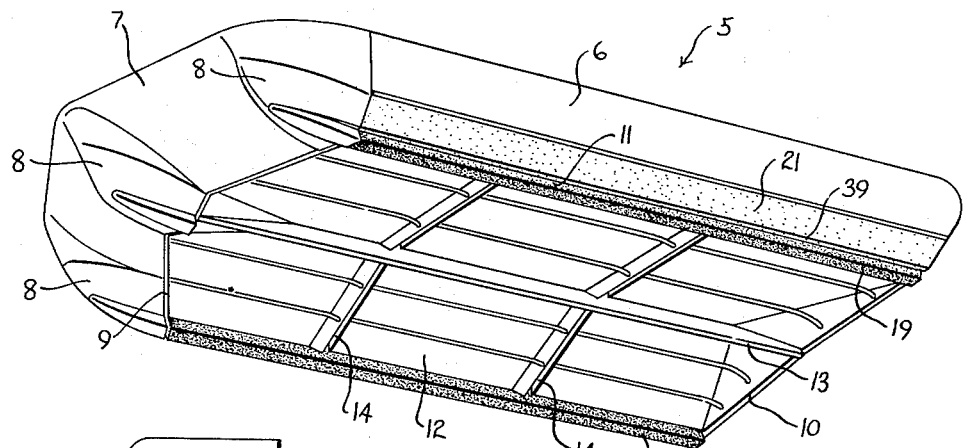
FIGURE 1 is a bottom perspective view of an air cushion vehicle embodying the principles of this invention.
Figure 2:
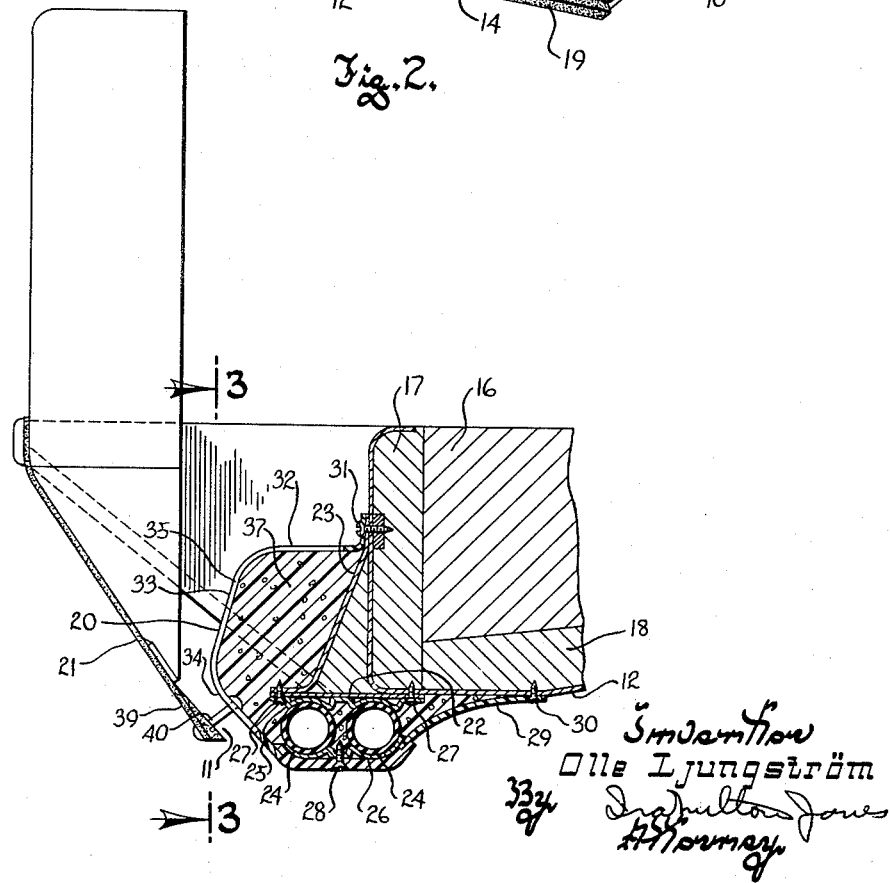
FIGURE 2 is a fragmentary cross sectional view of the vehicle, taken intermediate its front and rear ends.

Referring now more particularly to the accompanying drawings, the numeral 5 designates generally an air cushion vehicle embodying the principles of this invention, which comprises, in general, a body section or hull 6 that is substantially rectangular in planform, and a bow portion 7 on which there are pontoon-like lifting elements 8. The nature and purpose of the lifting elements is fully set forth in the above mentioned companion application, to which reference may be made for a description of other features of the vehicle not explained in detail herein.

Air is drawn downwardly into the body section by means of a rotatably driven propeller (not shown), and is expelled through a number of elongated, slot-like downwardly opening outlets. One such air outlet, designated 9, extends transversely across the vehicle near its front, between the hull and the bow portion; another outlet 10 extends across the vehicle at its rear; and at the sides of the hull there are lengthwise extending outlets 11 which are continuous with the front and rear transverse outlets 9 and 10.

The four air outlets just mentioned together surround an inner bottom wall 12 of the hull which is transversely concave in profile so that its central portion is at a higher level than its side edge portions. A lengthwise extending air outlet 13 opens through the bottom wall 12 of the hull along the longitudinal centerline of the vehicle, and there are additional transverse outlets 14 in the bottom wall 12, intermediate the front and rear transverse outlets 9 and 10. From all of these outlets air issues downwardly in curtain-like jets or streams to form an air cushion upon which the vehicle is supported at a small distance above the surface of land or water.

The hull or body section 6 of the vehicle comprises a rigid inner supporting structure or frame 16 having side members 17 of substantial height that extend along the entire length of the hull, and transverse members 18 that reinforce the bottom wall 12 of the hull. Carried by this rigid frame are a pair of resiliently flexible shock absorbing structures, one at each side of the hull, which define the side air outlets 11 and provide support for the vehicle when it is at rest. Each of these shock absorbing structures comprises, in general, a resiliently flexible runner or rail 19 that extends lengthwise along the side of the vehicle, inwardly adjacent to the side air outlet 11, a resiliently flexible inner wall member 20 which extends upwardly from the runner, and an outer wall member 21.

Each of the rails 19 is made of fibre glass laminate or similar material which does not tend to become frozen fast to ice and snow and which is resiliently flexible along its length. Each rail is supported beneath a rigid horizontal plate 22 that projects sidewardly from the underside of its adjacent side member 17 of the frame and extends along the length thereof. A diagonal truss plate 23, extending along the full length of the supporting plate 22, is connected to the latter along its outer edge and to the side member 17 of the frame, to provide reinforcement for the supporting plate.

Each of the runners is held spaced beneath its supporting plate by shock absorbing means, shown as comprising a pair of lengthwise extending side-by-side tubes 24 of rubber or similar resilient material, filled with an elastic medium such as rubber or air. Profiled channel members 25 and 26 of substantially W shaped cross section are secured above and below the tubes 24 to hold them against lateral displacement, the channel member 25 above each pair of tubes being secured directly to the underside of the supporting plate 22, as by means of screws 27, and the channel member 26 beneath the tubes being secured directly to the rail or runner, as by means of screws 28.

A resiliently flexible anchoring panel 29, of reinforced plastic or the like, is joined to the inner edge of each rail and is secured to the bottom wall 11 inwardly of the rail, as by means of screws 30, to provide a smooth fillet between the rail and the bottom wall 12, which fillet is capable of flexing with the rail.

The inner wall member 20 is formed of material which is tough, smooth and resilient but somewhat stiffer than the rail, and can be a glass fibre reinforced plastic. At its upper edge portion it is fastened, as by means of screws 31, to the side frame member 17, near the top thereof. The inner wall member is so curved as to have a portion 32 directly below its upper edge portion that projects sidewardly outwardly, a downwardly extending medial portion 33, and a downwardly and inwardly inclined lower portion 34. At its lower edge it is joined to the outer edge of the rail.

At intervals along its length the inner wall member has narrow slits 35 that extend vertically from near its lower edge almost to its upper edge portion, so that it provides, in effect, a series of lengthwise adjacent bowed spring fingers, each having an outwardly convex profile as seen from the front or the rear of the vehicle. It will be apparent that the lower portion of each of these spring fingers is capable of flexing upwardly substantially independently of the others, so as to accommodate upward flexing of localized portions of the rail.

Behind the inner wall member, serving as a packing between it and the rigid supporting structure, is a filler 37 of a soft, spongy elastic material, such as polyurethane foam of a type that does not absorb water. This filler blocks flow of air through the slits 35 in the inner wall member, in effect preserving the continuity of the wall member insofar as it functions to guide air through the outlet 11, inasmuch as the portions of the filler which are exposed at the slits 35 are nearly flush with the outer surface of the inner wall member. The filler also surrounds the shock absorber tubes 24 and fills the space above the fillet or anchoring panel 29, thus cooperating with the channel members 25 and 26 in preventing lateral displacement of the shock absorber tubes without interfering with their flexing deformation.

It will be apparent that the inner wall member 20, the filler 37 and the runner or rail 19 cooperate to form a shock absorbing unit which is capable of resilient localized deformation over such portions of its length as accommodate the condition of the ground or other surface that the vehicle encounters. The resiliency or springing constant of the runner can be so adjusted that for a drop of the vehicle through a calculated height the total impact force does not exceed three times the weight of the vehicle.

The outer wall member 21, which cooperates with the inner wall member 20 in defining the side outlet 11, has at its bottom an obliquely downwardly and inwardly extending flange 39 of fairly stiff rubber or similar resiliently deformable material, which substantially parallels the obliquely inclined lower portion 34 of the inner wall member 20, and which of course extends along the entire length of the hull. Normally this flange is held spaced a predetermined maximum distance from the inner wall member by means of spacer bolts 40 which are secured to it at lengthwise spaced intervals along its length and which extend through the slits 35 in the inner wall member. The heads of the bolts are confined between the inner surface of the inner wall member and the outer surface of the filler 37. Hence, when the flange 39 is deflected inwardly by an impact against it, the heads of the bolts connected with its affected portion can yieldingly move inwardly against the filler, and as the filler is compressed by such bolts it imposes upon them a biasing force by which they are urged back out to their normal positions. Thus the outlet 11 tends to maintain substantially its normal width, so that deformations of the side portions of the vehicle in response to impacts cannot result in blocking of the mouth of the outlet.

It will be observed that the above described arrangement of the inner and outer wall elements disposes the mouths of the side air outlets 11 closely adjacent to the rails or runners 19, which are at the lowest parts of the vehicle, and thus promotes efficient sustentation of the vehicle.

From the foregoing description taken together with the accompanying drawings it will be apparent that this invention provides an air cushion or ground effect vehicle which is well adapted for travel over rocky or other rough terrain by reason of the provision of resiliently flexible runners extending lengthwise along the sides of the vehicle at its bottom, and flexible side wall portions on the vehicle adjacent to the runners. It will also be apparent that the vehicle of this invention is highly efficient because it has slot-like downwardly opening air outlets which extend along the runners outwardly adjacent to them, with their mouths near the undersides of the runners, and that these air outlets, although defined by resiliently flexible wall elements, cannot be blocked or closed by shock absorbing deformation of the wall elements.

What is claimed as my invention is:
1. In an air cushion vehicle or the like having a narrow, elongated, downwardly opening fluid outlet lengthwise adjacent to one side of the vehicle:
   (A) a rigid inner supporting structure;
   (B) a resiliently flexible inner wall member extending lengthwise along said side of the vehicle, and secured along its upper edge portion to said supporting structure, said inner wall member being curved along its height so as to have an obliquely downwardly and inwardly extending portion near its bottom which is flexible upwardly;
   (C) a resilient rail on said inner wall member, at the bottom thereof, providing a downwardly facing surface upon which the vehicle can rest;
   (D) resilient means confined between the rail and the underside of the supporting structure yieldingly anchoring the rail and the bottom portion of the inner wall member to the supporting structure;
   (E) an outer wall member secured to said supporting structure in spaced relation to said inner wall member, having a bottom portion which is inclined downwardly and inwardly so as to cooperate with the inner wall member in defining said fluid outlet, and which is resiliently yieldable so as to be capable of flexing along with the inner wall member and the rail; and (F) means providing resilient connections between the outer member and the supporting structure at lengthwise spaced intervals along the outer wall member, by which the wall members are maintained in spaced apart slot defining relationship along their entire lengths despite localized flexing deformation of the rail and wall members.

2. The air cushion vehicle of claim 1 wherein said rigid inner supporting structure extends partway downwardly along the inner wall member, in laterally spaced relation to a portion thereof beneath its upper edge, further characterized by: a filler of resilient, spongy cushioning material between said inner wall member and the rigid supporting structure, which cooperates with the resilient material of the inner wall member in maintaining the shape thereof.

3. The air cushion vehicle of claim 2, further characterized by: resilient tubular means, filled with elastic material, above the rail and confined between it and the rigid supporting structure, by which resiliently yielding support is afforded to the rail.

4. In an air cushion vehicle or the like having a narrow, elongated downwardly opening fluid outlet lengthwise adjacent to one side of the vehicle:
(A) a rigid inner supporting structure in the vehicle;
(B) an elongated resiliently flexible rail;
(C) resilient means supporting the rail beneath one side of the supporting structure and with the rail extending therealong;
(D) a resiliently flexible inner wall element having its upper and lower edge portions respectively connected with the supporting structure and with the rail, said wall element being bowed along its height to have a convex surface facing outwardly toward said side of the vehicle; and
(E) an outer wall element spaced outwardly toward said side of the vehicle from the inner wall element and cooperating with the latter to define a downwardly opening slot-like air outlet, said outer wall element having a resiliently flexible bottom portion so as to be capable of yieldingly flexing along with the rail in response to localized upward forces imposed upon the vehicle.

5. In an air cushion vehicle or the like having an elongated slot-like downwardly opening fluid outlet defined by the opposing surfaces of a pair of spaced apart wall elements, means providing a shock absorbing runner adjacent to said outlet, said means comprising:
(A) an inner rigid supporting structure having a portion adjacent to said outlet and extending along the same;
(B) an elongated resiliently flexible rail-like member;
(C) resiliently yieldable means supporting the rail-like member from the supporting structure, beneath said portion of the supporting structure, and with the rail-like member extending along the mouth of the outlet adjacent to one side thereof; and
(D) a resiliently flexible wall element providing a surface at one side of said outlet, said wall element having its upper edge portion connected with said supporting structure above the rail-like member and having its lower edge portion connected with the rail-like member to be flexible upwardly therewith.

6. The structure of claim 5 further characterized by:
(A) vertical slits in said wall member, through a substantial portion of the height thereof, whereby localized portions of the wall member can flex upwardly with the rail-like member independently of the remainder thereof, to accommodate localized flexing of portions of the rail-like member independently of the remainder thereof; and
(B) a filling of resiliently flexible spongy material behind said wall member and having surface portions exposed at said slits which are substantially flush with the adjacent faces of the wall member so as to cooperate with the same in providing one of the surfaces that define the slot-like opening.

7. Means providing a wall element having a substantially continuous, unbroken surface by which flow of fluid can be guided, and which wall element is capable of absorbing the shock of an impact upon any localized area of an elongated edge portion thereof by resiliently deforming only in the vicinity of that area, said means comprising:
(A) an elongated rigid supporting member;
(B) means providing a plurality of bowed spring fingers, each secured at one end to said rigid supporting member with the several spring fingers edgewise adjacent to one another, extending in the same directions, and having their other end portions lying in a common plane;
(C) elongated resiliently flexible means connecting said other end portions of the several spring fingers; and
(D) a filler of yieldingly resilient spongy material confined within the bights of the spring fingers and having surface portions exposed at the interstices between the spring fingers and coperating with the convex spring finger surfaces to define a substantially continuous and unbroken surface.

References Cited in the file of this patent
UNITED STATES PATENTS

| | | |
|---|---|---|
| 3,052,483 | Petersen | Sept. 4, 1962 |
| 3,094,223 | Smith | June 18, 1963 |